Sept. 17, 1957    M. V. MARSHALL    2,806,730
MOTOR VEHICLE FENDER BUMPER
Filed March 20, 1953

INVENTOR.
Mary V. Marshall
BY Victor J. Evans & Co.
ATTORNEYS

United States Patent Office 2,806,730
Patented Sept. 17, 1957

2,806,730

MOTOR VEHICLE FENDER BUMPER

Mary V. Marshall, Jackson Heights, N. Y.

Application March 20, 1953, Serial No. 343,693

1 Claim. (Cl. 293—62)

This invention relates to motor vehicle bumpers of the button type and which are adapted to be located in different positions particularly on the fenders or sides of the body of a vehicle, and in particular a mushroom type head of rubber or other elastic material supported by a spring on a stem extended through the outer wall of a fender or the like and anchored in an inner wall with a threaded rod having nuts thereon and with a spring connecting the stem to the rod and aligned with both the stem and rod.

The purpose of this invention is to provide means for preventing the side surfaces of fenders or other parts of the body of a motor vehicle coming in contact with corresponding surfaces of other vehicles or with wall surfaces or posts and the like.

In operating a motor vehicle it is often difficult to determine the exact distances, side surfaces of the vehicle are spaced from fixed objects or other vehicles and for this reason numerous fenders and side surfaces of motor vehicles are scratched and dented.

With this thought in mind this invention contemplates a bumper of rubber or the like resiliently mounted on and extended from the side surface of a vehicle body or fender wherein the device will engage another vehicle, wall, or surface, and thereby warn the operator of the vehicle that the side surface of the vehicle or fender is comparatively close to another similar surface or object.

The object of this invention is, therefore, to provide means for mounting a resilient button or bumper in a side wall of a vehicle body or fender whereby the device extends beyond the wall in which it is mounted so that contact of the wall with another wall or the like may be prevented.

Another object of the invention is to provide a fender bumper for motor vehicle bodies that is adapted to be installed on vehicles now in use.

A further object of the invention is to provide a button-like fender bumper which is of a simple and economical construction.

With these and other objects and advantages in view the invention embodies a stem having a spring extended therefrom, and with nuts threaded thereon, aligned with the stem and spring for anchoring the device in an inner wall of a motor vehicle body with the opposite end of the stem extended through an opening in an outer wall of the body and having a rubber cap or a button thereon.

Other features and advantages of the invention will appear from the following description taken in connection with the drawing, wherein:

Figure 3 is a sectional plan taken on line 3—3 of Fig. 1 illustrating the bumper and mounting thereof and showing the parts on an enlarged scale.

Figure 4 is a plan view of the bumper showing the serrated flange or skirt depending from the head.

Figure 5 is a sectional plan similar to that shown in Figure 3 showing the button or bumper or bumper head compressed.

Figure 1:
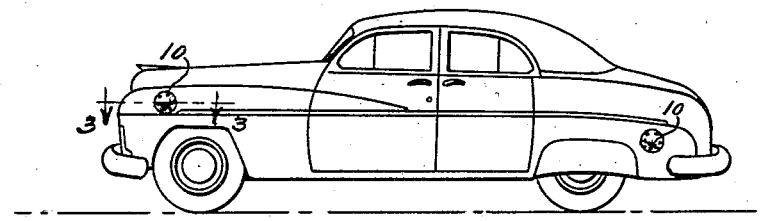
Figure 1 is a side elevational view showing a motor vehicle body with bumpers of this invention installed on the forward and rear parts thereof.
Figure 2:
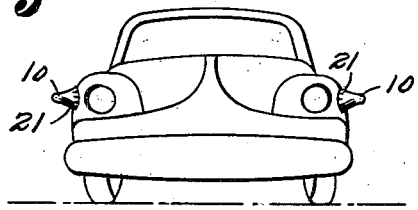
Figure 2 is a front elevational view of the motor vehicle body shown in Fig. 1 showing bumpers extended from the sides of the front fenders of the body.
Figure 2:
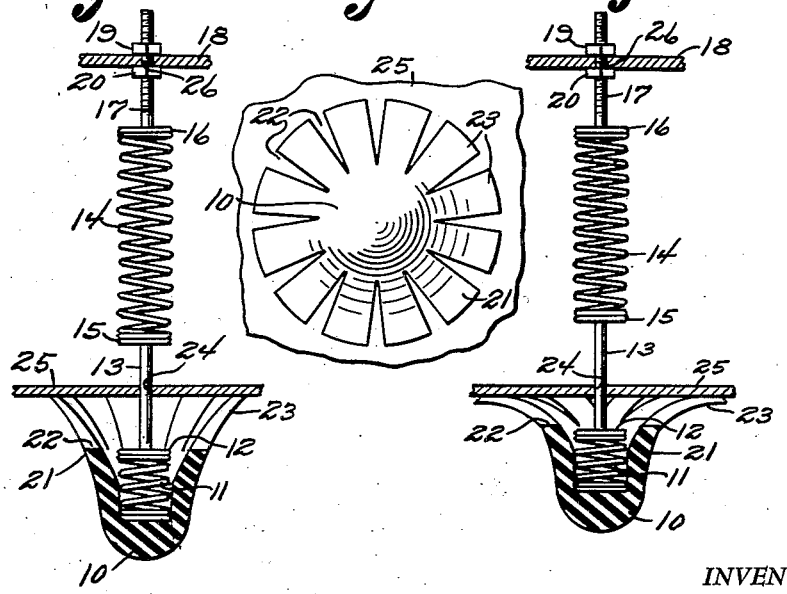

Referring now to the drawing wherein like reference characters denote corresponding parts the improved fender bumper of this invention includes a mushroom type head 10 of rubber or other suitable resilient material, a spring 11 with which the head is mounted on a disc 12 at the end of a stem 13, a spring 14 positioned with one end attached to a disc 15 on the stem 13 and the other to a disc 16 on a threaded rod 17 and, as illustrated in Figures 3 and 5 the threaded rod 17 is anchored in an inner wall 18 with locking nuts 19 and 20, threaded on the rod and positioned on opposite sides of the wall 18.

The head 10 is provided with a flange or skirt 21 and the skirt is provided with spaced notches 22 whereby a force exerted against the outer end of the head 10 forming fingers 23 spreads the skirt with the fingers 23 extended outwardly as shown in Fig. 4.

In assembling the bumper the outer end of the spring 11 is forced into the closed end of the cup-shaped bumper or head 10 with the end and adjoining convolutions of the spring embedded in the material of the bumper whereby inherent resiliency in the convolutions of the spring and the resiliency of the bumper definitely secures the head on the end of the spring. The disc 12 which is integral with the stem 13 is secured to the end of the spring 11 by welding, or other suitable means, the disc 15 integral with the opposite end of the stem 13 is secured to the end convolutions of the spring 14 by welding or other suitable means and the disc 16, integral with the rod 17, is secured to the inner end of the spring 14 by welding or other suitable means.

The outer portion of the device, or stem 13, is slidably mounted in a slot 24 in an outer wall 25 and with the inner end of the device, formed with the threaded rod 17, positioned in an opening 26 in a wall 18 the stem 13 is free to slide outwardly and inwardly in the opening 24 of the wall 25 whereby pressure exerted against the head 10 first compresses the spring 11, and forces the stem 13 inwardly to compress the spring 14. It will be understood that these devices may be located at different points over the side surfaces of the motor vehicle and as many of the devices may be used as may be desired.

With these devices installed at spaced points over the surfaces of the sides of the vehicle the heads of rubber, or the like, will first engage a side surface of another vehicle or object whereby the operator of the vehicle will be warned that the clearance at the side on which the engaging device is positioned is comparatively small.

It will be understood that modifications, within the scope of the appended claim, may be made in the design and arrangement of the parts of the device without departing from the spirit of the invention.

What is claimed is:

In a motor vehicle fender bumper, the combination which comprises a motor vehicle fender having an inner wall and an outer wall and said walls having aligned openings therein, a stem having discs on the ends slidably mounted in the opening in the outer wall of the fender, a spring welded to the disc on the outer end of the stem, a cup-shaped head of resilient material having a serrated skirt extended therefrom frictionally mounted on the outer end of the spring welded to the disc on the outer end of the stem, the outer end of the spring being embedded in the resilient material of the head, a spring welded to and extended from the disc on the inner end of the stem, a threaded rod secured by nuts in the opening through the inner wall of the fender; and a disc carried by and integral with the rod extended through the opening in the inner wall of the fender; and said disc on the rod being welded to the inner end of the spring extended from the disc on the inner end of the stem extended through the outer wall of the fender, said stem, rod, and spring being in axial alignment.

References Cited in the file of this patent

UNITED STATES PATENTS

| | | |
|---|---|---|
| 1,762,870 | Lange | June 10, 1930 |
| 2,230,333 | Painter | Feb. 4, 1941 |

FOREIGN PATENTS

| | | |
|---|---|---|
| 590,257 | France | June 13, 1925 |